United States Patent
Takayanagi et al.

(10) Patent No.: US 10,810,969 B2
(45) Date of Patent: Oct. 20, 2020

(54) TEXTURE DISPLAY DEVICE, TEXTURE DISPLAY METHOD, AND TEXTURE DISPLAY PROGRAM

(71) Applicant: MITSUBISHI ELECTRIC CORPORATION, Tokyo (JP)

(72) Inventors: Aki Takayanagi, Tokyo (JP); Yoshitomo Nakamura, Tokyo (JP); Toshiaki Kubo, Tokyo (JP); Yoko Inoue, Tokyo (JP); Toshiaki Fujino, Tokyo (JP); Takanori Okumura, Tokyo (JP); Naoko Iwasaki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/348,454

(22) PCT Filed: Dec. 8, 2017

(86) PCT No.: PCT/JP2017/044122
§ 371 (c)(1),
(2) Date: May 8, 2019

(87) PCT Pub. No.: WO2018/131349
PCT Pub. Date: Jul. 19, 2018

(65) Prior Publication Data
US 2020/0058267 A1    Feb. 20, 2020

(30) Foreign Application Priority Data
Jan. 16, 2017    (JP) .............................. 2017-005034

(51) Int. Cl.
*G09G 5/10*      (2006.01)
*G06T 7/40*      (2017.01)
*H04N 5/72*      (2006.01)

(52) U.S. Cl.
CPC ................. *G09G 5/10* (2013.01); *G06T 7/40* (2013.01); *H04N 5/72* (2013.01); *G09G 2320/0646* (2013.01)

(58) Field of Classification Search
CPC .... G09G 5/10; G09G 2320/0646; G09G 3/20; G09G 3/32; G09G 2354/00;
(Continued)

(56) References Cited

U.S. PATENT DOCUMENTS

2008/0316374 A1*  12/2008  Koike ................. H04N 13/363
                                                       349/1
2011/0227922 A1*   9/2011  Shim ...................... G06T 15/50
                                                       345/426
(Continued)

FOREIGN PATENT DOCUMENTS

JP        2009-3166 A      1/2009
JP        2009-75461 A     4/2009
(Continued)

*Primary Examiner* — Premal R Patel
(74) *Attorney, Agent, or Firm* — Birch, Stewart, Kolasch & Birch, LLP

(57) ABSTRACT

A texture display device includes a display unit in which each pixel includes a condensing type element having light distribution at a first spread angle and a diffusing type element having light distribution at a second spread angle larger than the first spread angle, a pixel signal generation unit that generates a pixel signal based on image data and texture data of an object to be displayed on the display unit, and a control unit that controls light emission intensity of the condensing type element and the diffusing type element based on the pixel signal.

6 Claims, 11 Drawing Sheets

(58) Field of Classification Search
CPC ...... G09G 2320/068; H04N 5/72; G06T 7/40; G02F 1/1333
See application file for complete search history.

(56) References Cited

U.S. PATENT DOCUMENTS

2014/0168251 A1* 6/2014 Adachi .................. G06T 15/80
                                                         345/591
2016/0261803 A1* 9/2016 Eom ................. H04N 5/23216
2017/0316736 A1* 11/2017 Hughes ................ H01L 25/048

FOREIGN PATENT DOCUMENTS

| JP | 2010-107819 A | 5/2010 |
| JP | 2010-277901 A | 12/2010 |
| JP | 2014-75486 A | 4/2014 |
| JP | 2015-530604 A | 10/2015 |
| WO | WO 2013/180737 A1 | 12/2013 |

* cited by examiner

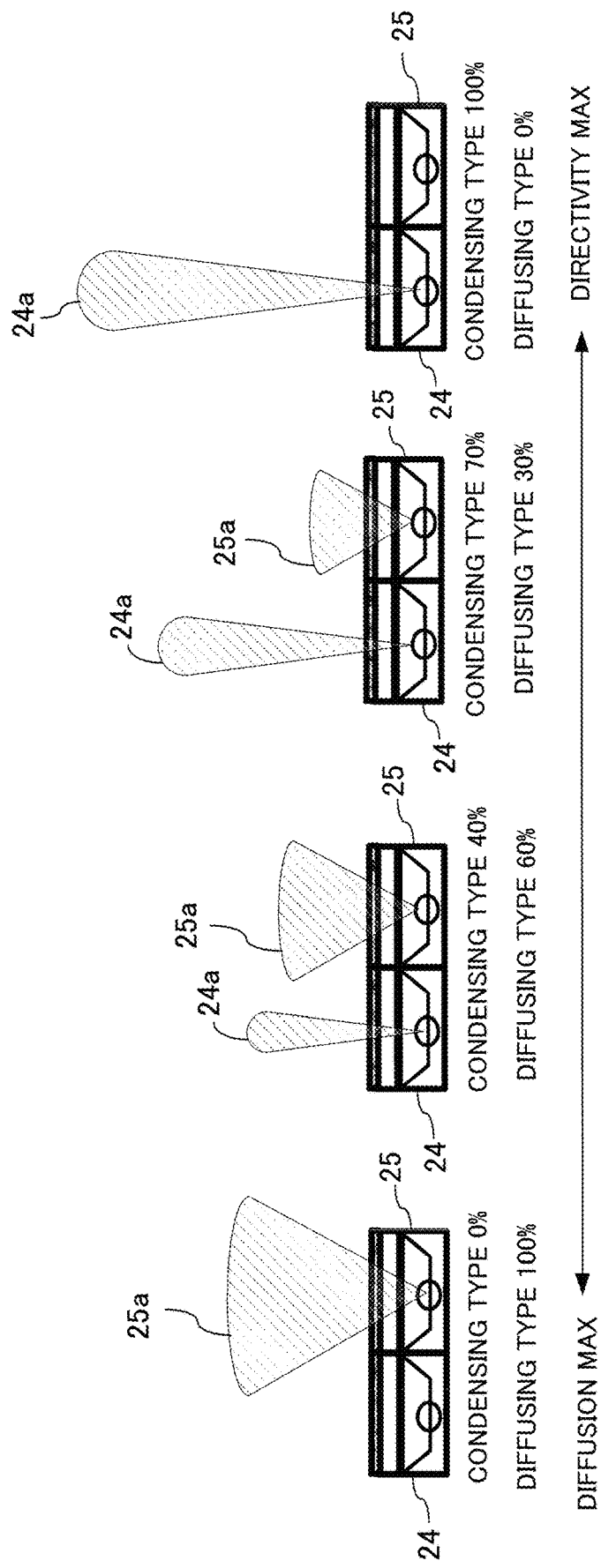

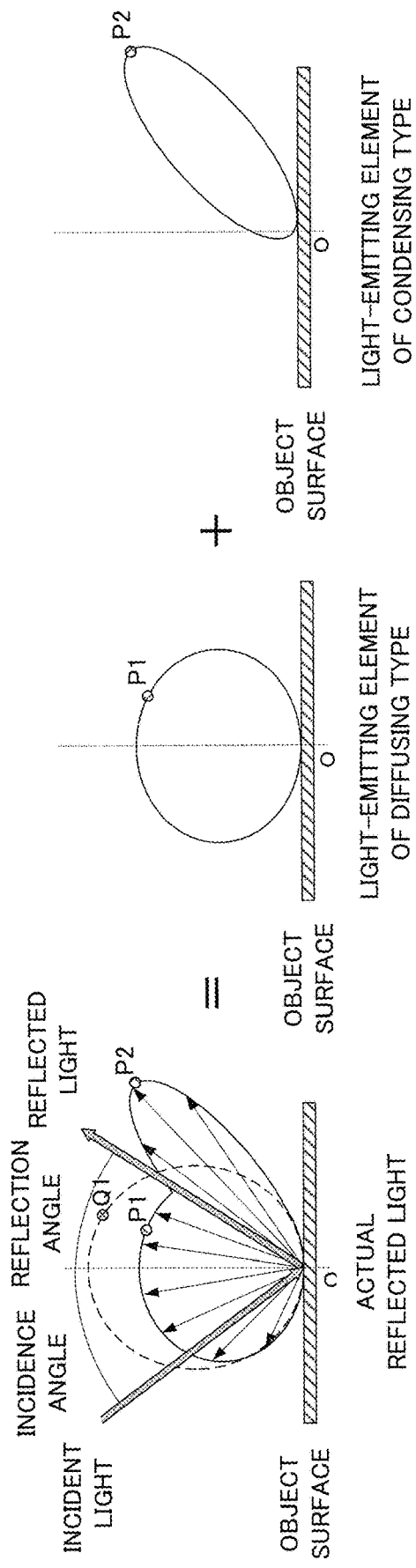

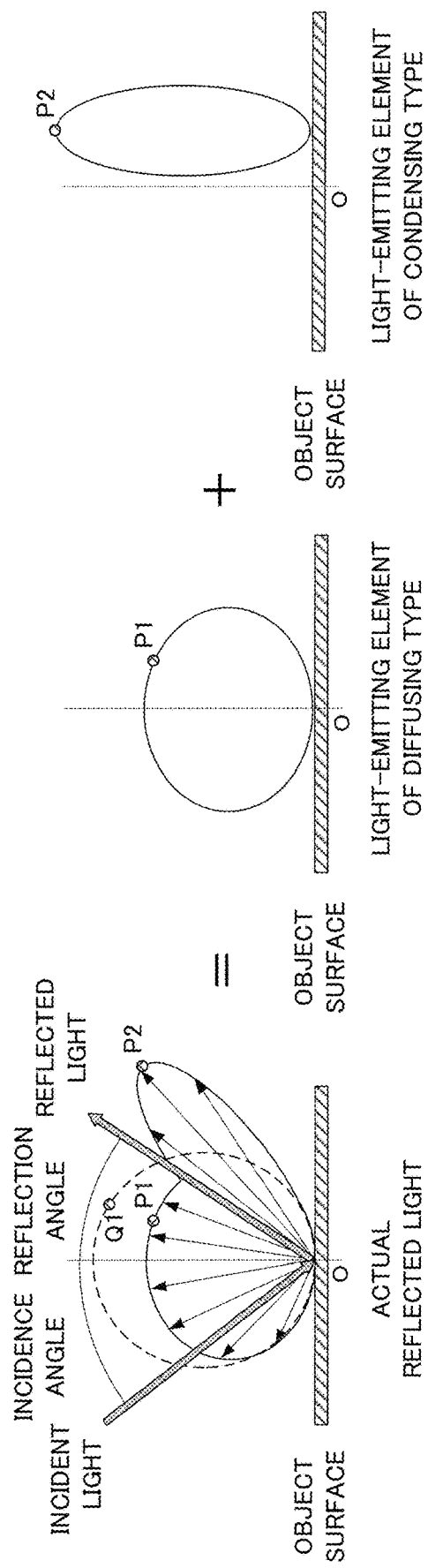

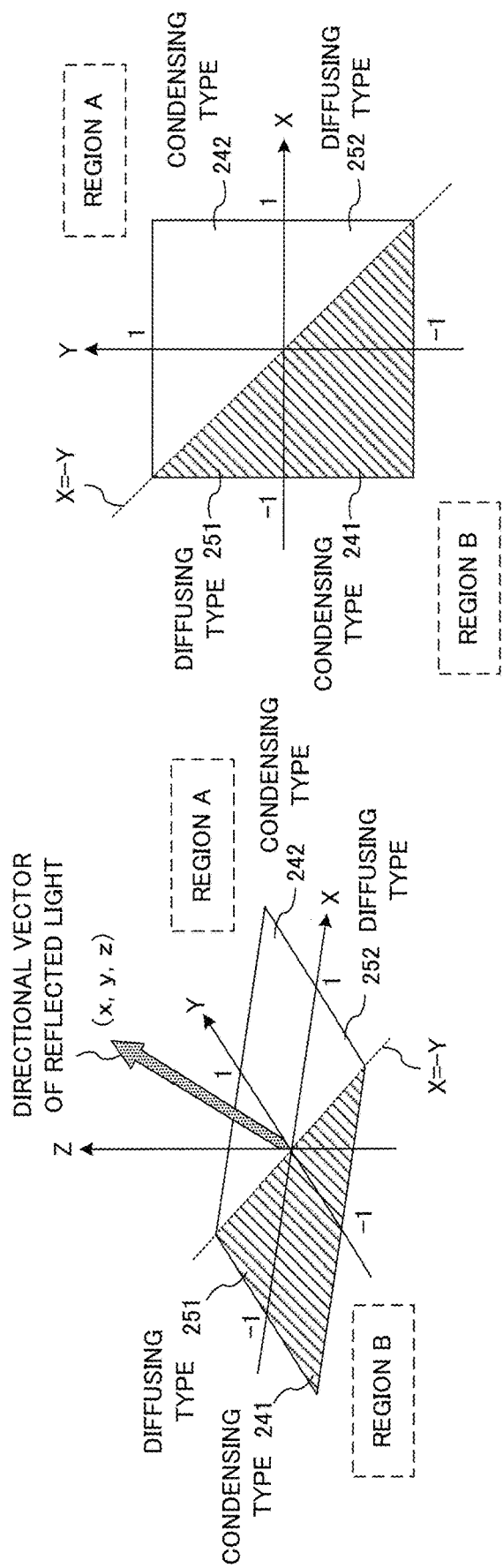

TEXTURE DISPLAY DEVICE, TEXTURE DISPLAY METHOD, AND TEXTURE DISPLAY PROGRAM

TECHNICAL FIELD

The present invention relates to a texture display device, a texture display method and a texture display program for displaying texture of a displayed object.

BACKGROUND ART

In recent years, liquid crystal displays, Light Emitting Diode (LED) displays, organic Electro Luminescence (EL) displays, and so forth are used as image display devices in place of Cathode Ray Tube (CRT) displays.

Conventional displays are optically designed so that light emission characteristics of pixels are as unifoLm as possible and display images (including video images and still images) that look the same irrespective of the angle of viewing the images as long as the angle is within the viewing angle of the display. In the real world, however, the intensity of light reflected by the surface of an object (observed object) varies depending on the observation angle with respect to the object. Therefore, the appearance of the object varies depending on the observation angle with respect to the object.

Conventional displays are incapable of controlling the intensity of light emitted from the display surface so as to change the intensity depending on the observation angle with respect to the display, and thus it is difficult to express the texture (the feel of the material) of the object displayed on the display as in the real world. For example, when a metal or plastic is displayed on the display, it is difficult to reproduce the texture of the metal or plastic on the conventional display. In consideration of such a problem, there has been proposed a display device that gives the observer (viewer) an impression like viewing an actual object by giving directivity to the light emitted from the display device.

Patent Reference 1 discloses a texture image display device that includes a beam control element array having a plurality of beam control elements each of which corresponds to one of a plurality of pixels of a panel display device, changes the directions of the same number of optical elements as the pixels, and thereby points the light emitted from the optical elements in a plurality of predetermined emission directions.

Patent Reference 2 discloses a display device including an image display unit, directivity control elements, a directivity determination unit that determines directivity of light in regard to each of the directivity control elements, a directivity detection unit that detects a subregion where the luminance is high based on an inputted image signal, and a directivity control unit that applies a voltage signal to directivity control elements corresponding to the detected subregion based on the result of the detection by the directivity detection unit.

PRIOR ART REFERENCE

Patent Reference

Patent Reference 1: Japanese Patent Application Publication No. 2009-003166 (see paragraphs 0008 to 0010, for example)

Patent Reference 2: Japanese Patent Application Publication No. 2009-075461 (see paragraphs 0080 to 0082, for example)

SUMMARY OF THE INVENTION

Problem to be Solved by the Invention

However, in the device of the Patent Reference 1, each beam control element corresponds to one of the plurality of pixels of the panel display device and the light emitted from the optical elements is pointed in a plurality of predetermined emission directions by changing the directions of the same number of optical elements as the pixels, and thus there are a problem in that the resolution of the display device drops and a problem in that the total luminance of the display device drops when the display screen is viewed from each direction since the luminance of each pixel is distributed to various directions.

Further, in the device of the Patent Reference 2, the directivity control elements for setting the directivity according to the voltage signal are used and the directivity control elements are implemented by using liquid crystal lenses, and thus there is a problem in that the cost rises.

An object of the present invention, which has been made to resolve the above-described problems, is to provide a texture display device, a texture display method and a texture display program capable of realizing low-cost production and improving the feel of texture and presence of displayed images without dropping the resolution or the luminance.

Means for Solving the Problem

A texture display device according to an aspect of the present invention includes a display unit including a plurality of pixels each of which includes a condensing type element that emits light having light distribution at a first spread angle and a diffusing type element that emits light having light distribution at a second spread angle larger than the first spread angle, a pixel signal generation unit that generates a pixel signal including light emission intensity information on the condensing type element and the diffusing type element based on image data of an object to be displayed on the display unit and texture data including reflection characteristic information on the object, and a control unit that controls light emission intensity of the condensing type element and the diffusing type element based on the pixel signal.

A texture display method according to another aspect of the present invention includes a pixel signal generation step of generating a pixel signal including light emission intensity information on a condensing type element and a diffusing type element based on image data of an object to be displayed on a display unit including a plurality of pixels each of which includes the condensing type element emitting light having light distribution at a first spread angle and the diffusing type element emitting light having light distribution at a second spread angle larger than the first spread angle and texture data including reflection characteristic information on the object and a control step of controlling light emission intensity of the condensing type element and the diffusing type element based on the pixel signal.

Effect of the Invention

According to the present invention, low-cost production can be realized and the feel of texture and presence of the displayed images can be improved without dropping the resolution or the luminance.

BRIEF DESCRIPTION OF THE DRAWINGS

FIGS. 5(a) to 5(d) are diagrams showing an example of control of light emission distribution of two types of light-emitting elements differing in the light distribution characteristic in the first embodiment.

FIGS. 7(a) to 7(c) are diagrams showing an example of a method of synthesizing reflected light having directivity in the first embodiment.

FIGS. 8(a) to 8(c) are diagrams showing another example of the method of synthesizing reflected light having directivity in the first embodiment.

FIGS. 9(a) and 9(b) are diagrams showing an example of control of light-emitting elements based on the direction of the directivity of the reflected light in the first embodiment.

MODE FOR CARRYING OUT THE INVENTION

A texture display device according to embodiments of the present invention will be described below. The invention of the texture display device described below can be regarded also as inventions of a texture display method and a texture display program. In the following description, specular reflection means reflection in which the incidence angle and the reflection angle of light are equal to each other, and diffuse reflection means reflection of incident light in various directions from the reflecting surface. Further, a light distribution characteristic means variation or distribution of luminosity of a light source (reflected light) with respect to an angle. A spread angle means the angle of spreading of a beam emitted from a light source.

(1) First Embodiment (1-1) Configuration of First Embodiment

Figure 1:
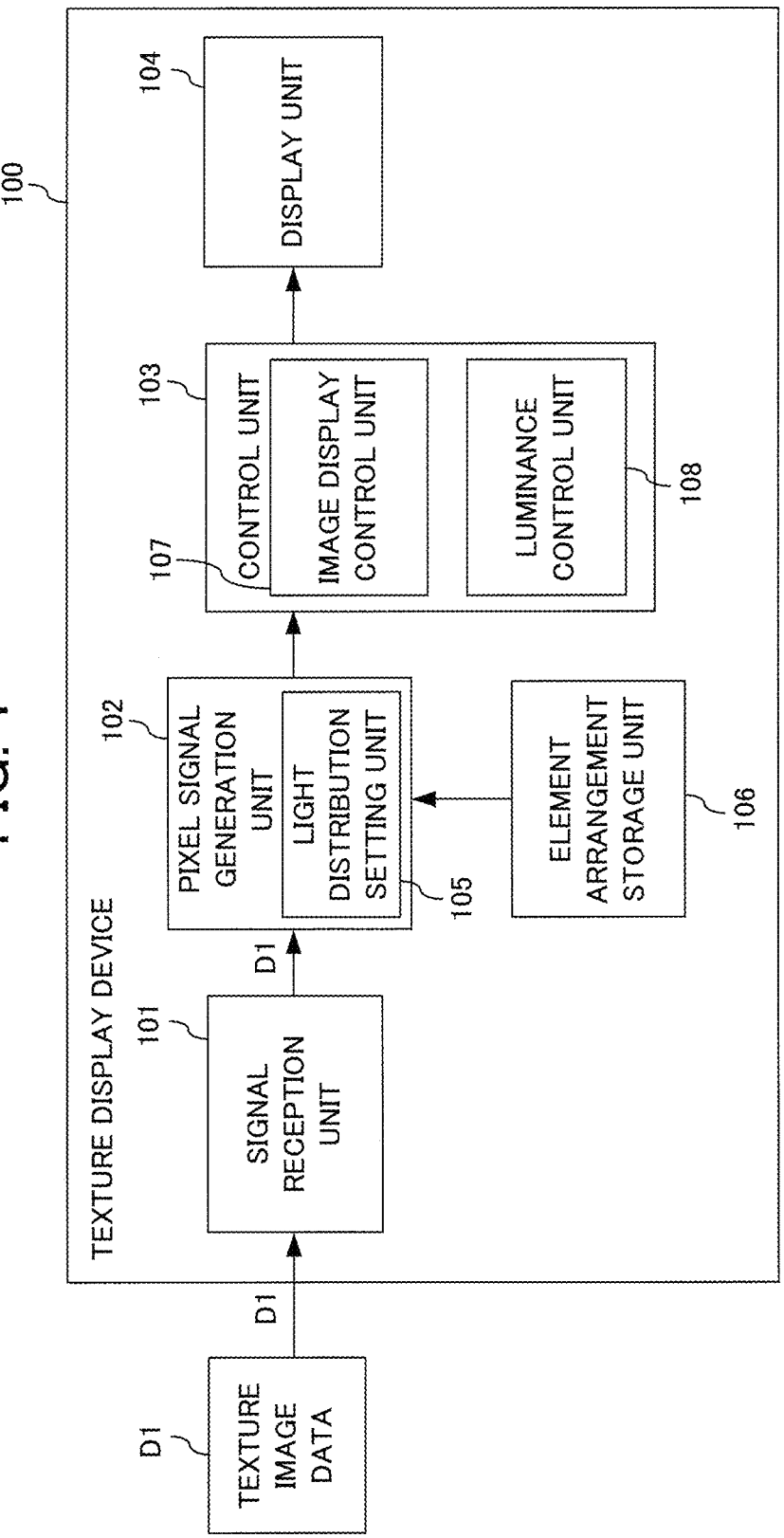
FIG. 1 is a block diagram schematically showing a configuration of a texture display device according to a first embodiment of the present invention.

FIG. 1 is a block diagram schematically showing the configuration of a texture display device 100 according to a first embodiment of the present invention. As shown in FIG. 1, the texture display device 100 according to the first embodiment includes a pixel signal generation unit 102, a control unit 103 and a display unit 104. The texture display device 100 may further include a signal reception unit 101 and an element arrangement storage unit 106.

As shown in FIG. 1, the signal reception unit 101 receives texture image data D1 of an object to be displayed. The texture image data D1 includes image data D2 of the object to be displayed and texture data D3 including reflection characteristic information on the object to be displayed. The texture image data D1 is, for example, a combination of one or more items of data among an image indicating the intensity of the specular reflection, an image indicating an object color representing the diffuse reflection, shape data indicating the shape and the height of a surface, and a normal line image indicating a normal line.

Further, the texture image data D1 may include shape data of the object and numeric data based on a bidirectional reflectance distribution function (BRDF) or a bidirectional scattering surface reflectance distribution function (BSSRDF) as a function indicating the direction and the intensity of reflected light.

The signal reception unit 101 loads in the received texture image data D1 and transmits an image of each frame of the images (frame data) to the pixel signal generation unit 102. The signal reception unit 101 may either transmit the frame data to the pixel signal generation unit 102 after storing the received texture image data D1 in a built-in memory or perform transmission of the texture image data D1 to the pixel signal generation unit 102 not via the memory.

The pixel signal generation unit 102 generates a signal for controlling each pixel (pixel signal) based on the texture image data D1 including the reflection characteristic information received from the signal reception unit 101. The pixel signal includes pixel values of the object to be displayed and RGB values for the displaying by each pixel. In the setting of the pixel values made by the pixel signal generation unit 102, it is desirable to determine the distribution so as to avoid biasing of data in consideration of the balance among a maximum luminance and a minimum luminance in the image to be displayed and a maximum luminance and a minimum luminance the texture display device 100 is capable of displaying.

In cases where the texture image data D1 received from the signal reception unit 101 is an image indicating the intensity of the specular reflection and an image indicating the object color representing the diffuse reflection, a normal line image indicating a normal line to a surface of a shape, shape data indicating the shape and the height of a surface, or a light source environment parameter, the pixel signal generation unit 102 determines the RGB values for the displaying by each pixel by carrying out the rendering of the graphics image of each frame based on the texture image data D1 (the image data D2 and the texture data D3).

As shown in FIG. 1, the pixel signal generation unit 102 includes a light distribution setting unit 105. The light distribution setting unit 105 determines light emission intensity (or light emission ratio) of each element of the display unit 104 differing in the light distribution characteristic based on the light source environment parameter and the intensity and the direction of the specular reflection light. The light emission intensity of each element determined by the light distribution setting unit 105 is included in the pixel signal. The pixel signal generation unit 102 transmits the generated pixel signal to the control unit 103.

The control unit 103 has a function of driving the texture display device 100 by making the light-emitting elements of the display unit 104 emit light based on the pixel signal received from the pixel signal generation unit 102. As shown in FIG. 1, the control unit 103 includes an image display control unit 107 and a luminance control unit 108. The image display control unit 107 has a function of controlling the images displayed on the display unit 104. The luminance control unit 108 has a function of controlling the luminance on the display unit 104.

The display unit 104 includes a plurality of pixels arranged like a matrix. Each pixel is formed by combining two or more types of elements (condensing type element and diffusing type element) differing in the light distribution characteristic and the two or more types of elements are arranged regularly. The element arrangement storage unit 106 has a function of storing the arrangement of the elements arranged in the display unit 104. The arrangement of the elements stored in the element arrangement storage unit 106 is referred to when the pixel signal generation unit 102 generates the pixel signal.

Figure 2A:
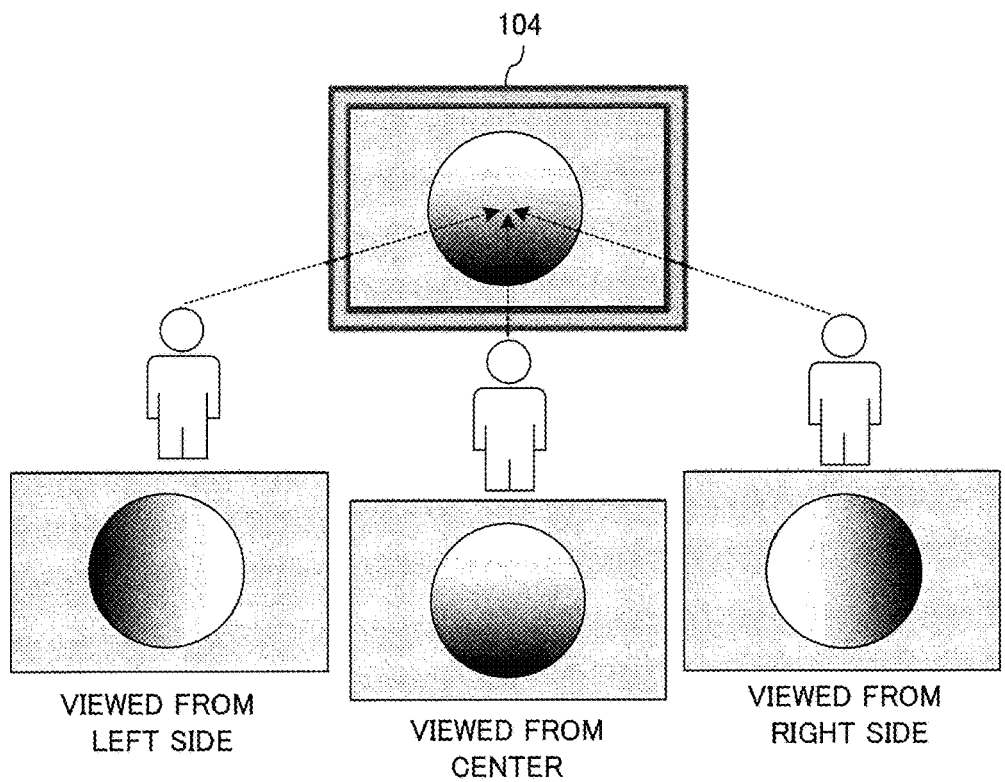
FIGS. 2(a) and 2(b) are diagrams for explaining texture of an image displayed on a display unit in the first embodiment.
Figure 2B:
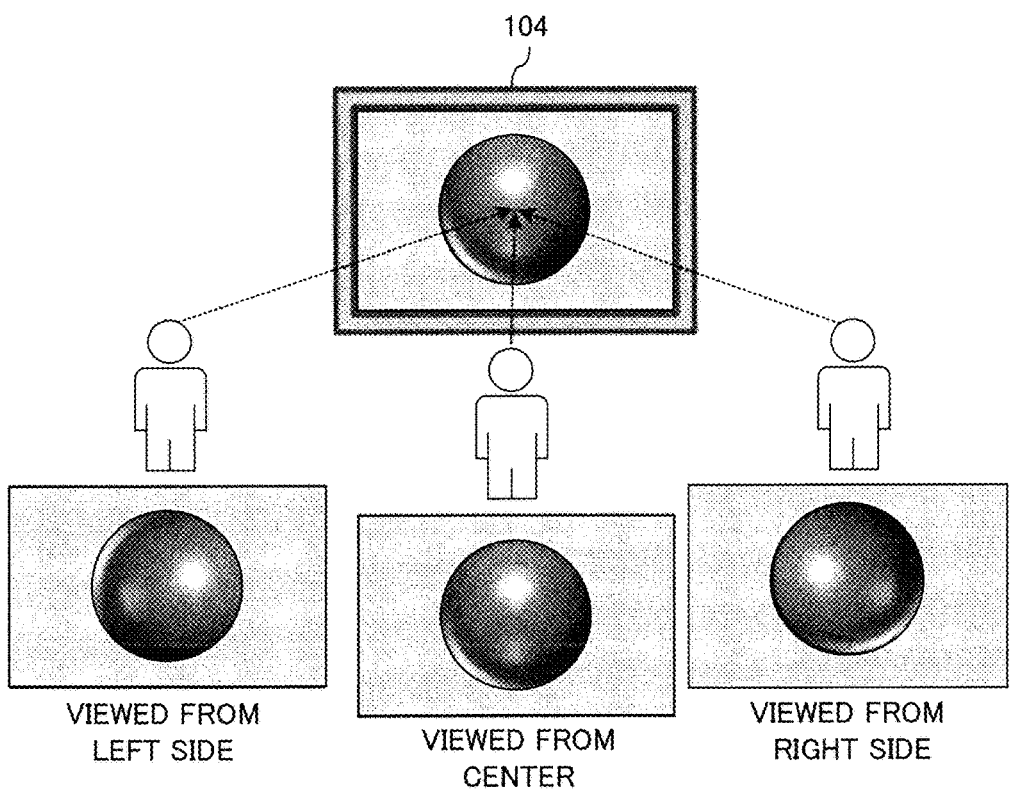

FIGS. 2(*a*) and 2(*b*) are diagrams for explaining the texture of an image displayed on the display unit 104 in the first embodiment. Here, FIGS. 2(*a*) and 2(*b*) show examples of an image displayed on the display unit 104 of the texture display device 100 in the first embodiment. In FIGS. 2(*a*) and 2(*b*), an image is displayed on the display unit 104 and appearance of the image viewed in three directions (right side, center, left side) is shown.

The image displayed on the display unit 104 in FIG. 2(*a*) includes a ball with no luster on its surface, and the image displayed on the display unit 104 in FIG. 2(*b*) includes a ball with luster (bright spot) on its surface. In the real world, the way light is reflected varies depending on characteristics of the object, the shape of the surface, and characteristics of the light source. For example, paper has an omnidirectional reflection characteristic (diffuse reflection characteristic), while metal has a reflection characteristic with directivity (specular reflection characteristic).

The ball with no luster on its surface shown in FIG. 2(*a*) is an example of an object having the omnidirectional reflection characteristic (hereinafter referred to also as a "diffuse reflection characteristic"), while the ball with luster on its surface shown in FIG. 2(*b*) is an example of an object having the reflection characteristic with directivity (hereinafter referred to also as a "specular reflection characteristic").

As shown in FIG. 2(*a*), in cases where the image displayed on the display unit 104 includes a ball with no luster on its surface, the appearance of the image does not vary much among the case of viewing the image from the left side of the screen, the case of viewing the image from the center (right in front) of the screen, and the case of viewing the image from the right side of the screen. As above, the appearance of a ball with no luster on its surface does not vary much irrespective of the angle of viewing since the ball has the diffuse reflection characteristic.

In contrast, as shown in FIG. 2(*b*), in cases where the image displayed on the display unit 104 includes a ball with luster (bright spot) on its surface, the bright spot appears on the right side in the case of viewing the image from the left side of the screen, the bright spot appears at the center in the case of viewing the image from the center of the screen, and the bright spot appears on the left side in the case of viewing the image from the right side of the screen. As above, the position of the bright spot varies depending on the angle of viewing since the ball with luster on its surface has the specular reflection characteristic. In the real world, there are cases where the appearance (texture) of an image varies as above depending on the angle of viewing the image.

Incidentally, the image displayed on the display unit 104 is not limited to a uniform texture image like those shown in FIGS. 2(*a*) and 2(*b*); the image can also be a common type of image including a plurality of textures and objects in one image. Further, the image is not limited to computer graphics but can be a natural image.

Figure 3B:
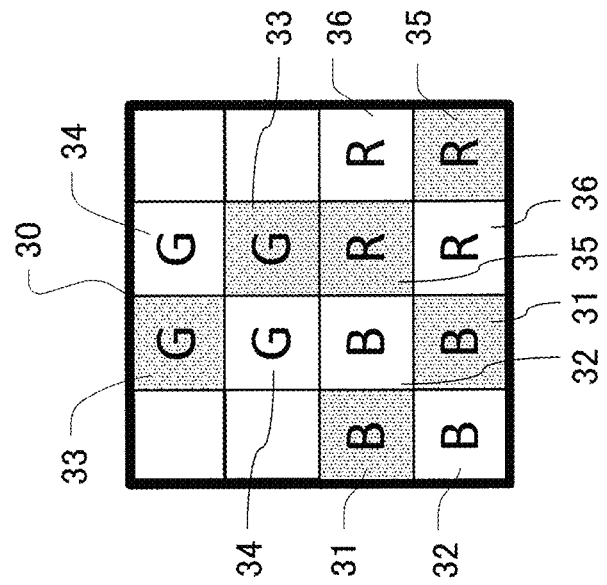
FIG. 3(b) is a diagram showing an example of a configuration of one pixel in the case where the display unit in the first embodiment is formed with bullet-type LEDs.
Figure 3A:
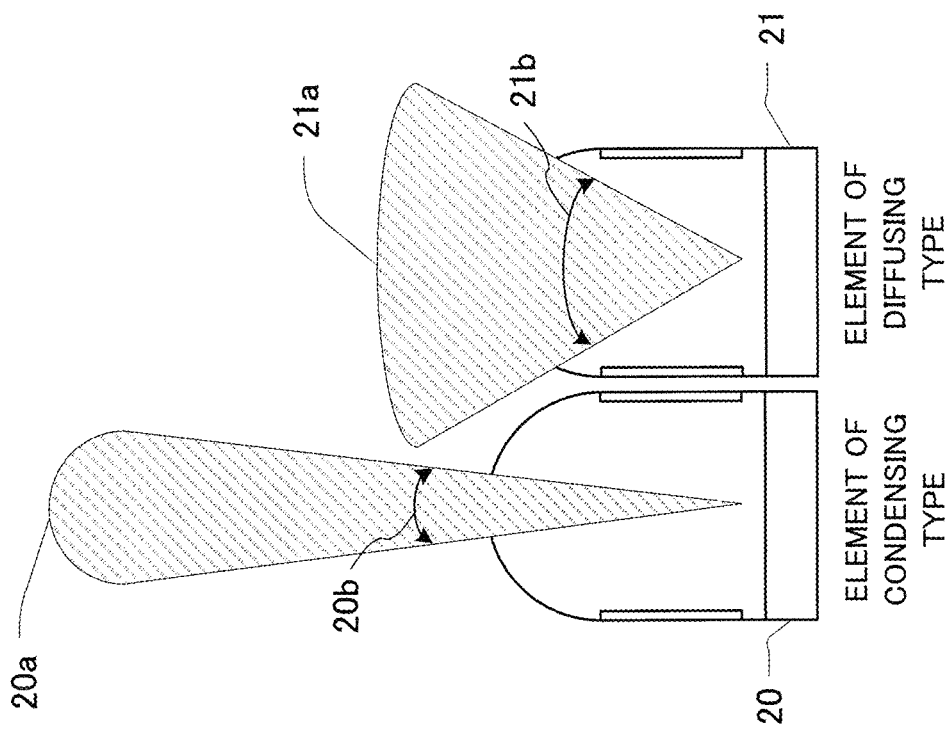
FIG. 3(a) is a diagram showing light distribution characteristics of light-emitting elements in a case where the display unit in the first embodiment is formed with bullet-type LEDs.

FIG. 3(*a*) is a diagram showing the light distribution characteristics of light-emitting elements in a case where the display unit 104 in the first embodiment is formed with bullet-type LEDs. FIG. 3(*b*) is a diagram showing an example of the configuration of one pixel in the case where the display unit 104 in the first embodiment is formed with bullet-type LEDs. FIGS. 3(*a*) and 3(*b*) show a case of using light-emitting elements 20 and 21 capable of emitting light of one of the RGB (red, green and blue) colors from one element (1 in 1 type).

As shown in FIGS. 3(*a*) and 3(*b*), in the case where the display unit 104 is formed with bullet-type LEDs, one pixel (pixel 30) is formed by combining light-emitting elements displaying one of the RGB colors and having light distribution characteristics different from each other.

In FIG. 3(*a*), the light-emitting element 20 is a condensing type element having the light distribution characteristic of the condensing type. The condensing type means a type in which the spread angle of the light distribution of the light-emitting element is narrow. In FIG. 3(*a*), the light-emitting element 20 has a light distribution characteristic 20*a*. As shown in FIG. 3(*a*), the spread angle (first spread angle) 20*b* of the light distribution characteristic 20*a* of the light-emitting element 20 is narrow and the light from the light-emitting element 20 cannot be observed at a position slightly deviated from the center of the optical axis. Therefore, the light-emitting element 20 having the condensing type light distribution characteristic is used as an element for expressing the reflection characteristic with directivity (specular reflection characteristic).

In FIG. 3(*a*), the light-emitting element 21 is a diffusing type element having the light distribution characteristic of the diffusing type. The diffusing type means a type in which the spread angle of the light distribution of the light-emitting element is wide. In FIG. 3(*a*), the light-emitting element 21 has a light distribution characteristic 21*a*. As shown in FIG. 3(*a*), the spread angle (second spread angle) 21*b* of the light distribution characteristic 21*a* of the light-emitting element 21 is wider than the spread angle 20*b* of the light distribution characteristic 20*a* of the light-emitting element 20 and the light from the light-emitting element 21 can be observed even at a position widely deviated from the center of the optical axis. Therefore, the light-emitting element 21 having the diffusing type light distribution characteristic is used as an element for expressing the omnidirectional reflection characteristic (diffuse reflection characteristic).

As shown in FIG. 3(*b*), in the case where the display unit 104 is famed with bullet-type LEDs, R (Red), B (Blue) and G (Green) light-emitting elements, four of each color, are used, for example. In the R light-emitting elements, two light-emitting elements of the condensing type and two light-emitting elements of the diffusing type are used. In the B light-emitting elements, two light-emitting elements of the condensing type and two light-emitting elements of the diffusing type are used. In the G light-emitting elements, two light-emitting elements of the condensing type and two light-emitting elements of the diffusing type are used. In FIG. 3(b), each light-emitting element of the condensing type is indicated by hatching, while each light-emitting element of the diffusing type is indicated by a region with a white background.

In FIG. 3(b), the B light-emitting elements 31, the G light-emitting elements 33 and the R light-emitting elements 35 are light-emitting elements of the condensing type, while the B light-emitting elements 32, the G light-emitting elements 34 and the R light-emitting elements 36 are light-emitting elements of the diffusing type. Incidentally, FIG. 3(b) shows an example of the arrangement of the light-emitting elements, and the number, arrangement and shapes of the light-emitting elements are not limited to the example shown in FIG. 3(b).

Further, while the light-emitting elements may be mounted with their optical axes at right angles with respect to the display surface of the display unit 104, the light-emitting elements may also be mounted with their optical axes inclined with respect to the display surface. By mounting the light-emitting elements with their optical axes inclined with respect to the display surface of the display unit 104, the light distribution characteristics of the light-emitting elements can be expressed in greater variety.

Figure 4B:
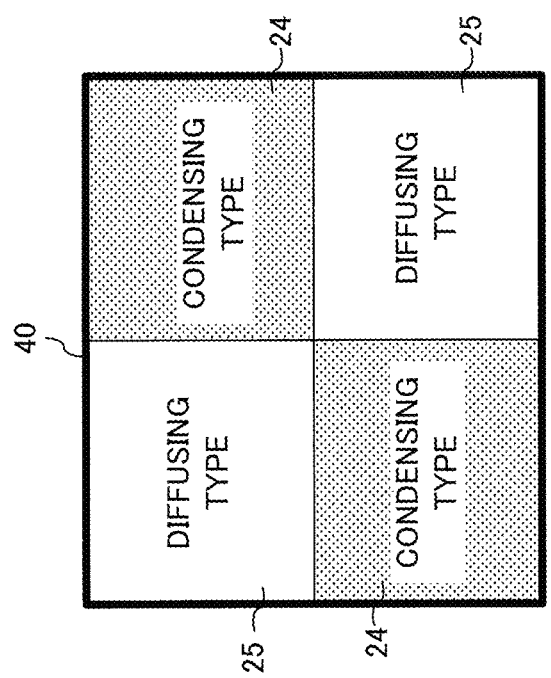
FIG. 4(b) is a diagram showing an example of a configuration of one pixel in the case where the display unit in the first embodiment is formed with surface-mounted LEDs.
Figure 4A:
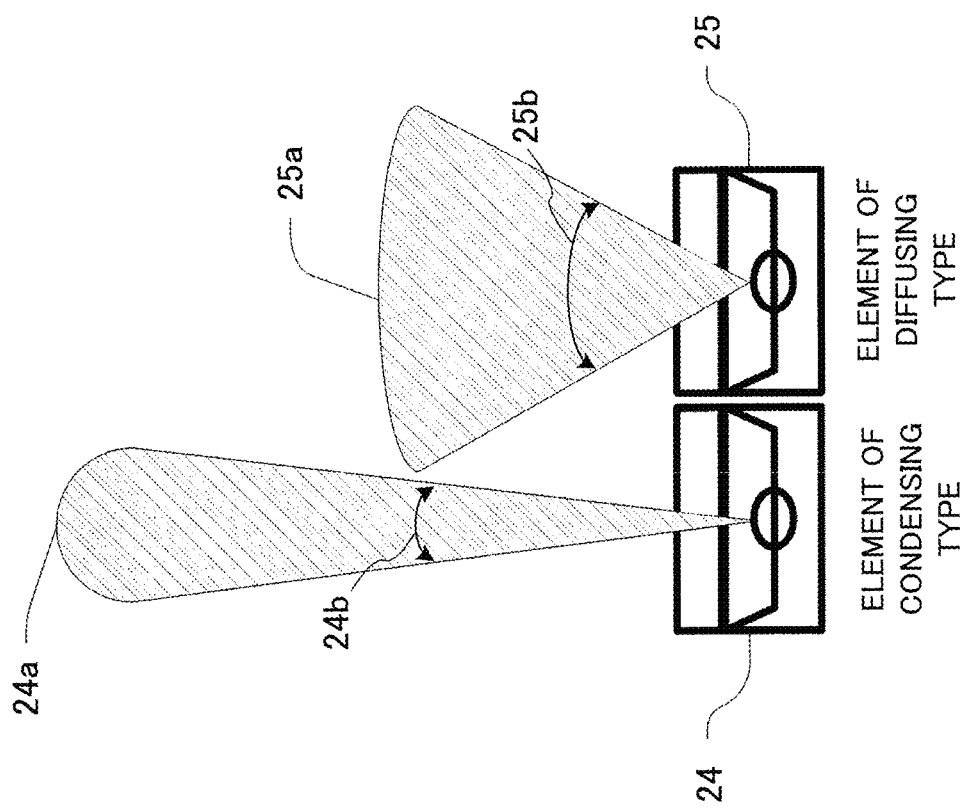
FIG. 4(a) is a diagram showing light distribution characteristics of light-emitting elements in a case where the display unit in the first embodiment is formed with surface-mounted LEDs.

FIG. 4(a) is a diagram showing the light distribution characteristics of light-emitting elements 24 and 25 in a case where the display unit 104 in the first embodiment is folioed with surface-mounted LEDs. FIG. 4(b) is a diagram showing an example of the configuration of one pixel (pixel 40) in the case where the display unit 104 in the first embodiment is formed with surface-mounted LEDs. FIGS. 4(a) and 4(b) show a case of using light-emitting elements 24 and 25 capable of emitting light of the three colors of RGB from one element (3 in 1 type).

As shown in FIGS. 4(a) and 4(b), the light-emitting element 24 is a condensing type element having the light distribution characteristic of the condensing type, while the light-emitting element 25 is a diffusing type element having the light distribution characteristic of the diffusing type. As shown in FIGS. 4(a) and 4(b), the light-emitting element 24 has a light distribution characteristic 24a whose spread angle is narrow, while the light-emitting element 25 has a light distribution characteristic 25a whose spread angle is wide.

As shown in FIGS. 4(a) and 4(b), also in the case where the display unit 104 is formed with surface-mounted LEDs, one pixel (pixel 40) is formed by combining light-emitting elements 24 having the light distribution characteristic 24a whose spread angle 24b is narrow and light-emitting elements 25 having the light distribution characteristic 25a whose spread angle 25b is wide.

As shown in FIG. 4(a), the light distribution characteristic 24a of the light-emitting element 24 has a narrow spread angle 24b (viewing angle) 24b and the light from the light-emitting element 24 cannot be observed at a position slightly deviated from the center of the optical axis. Therefore, the light-emitting element 24 having the condensing type light distribution characteristic is used as a light-emitting element for expressing the reflection characteristic with directivity (specular reflection characteristic).

In contrast, the spread angle 25b of the light distribution characteristic 25a of the light-emitting element 25 is wide as shown in FIG. 4(a), and thus the light from the light-emitting element 25 can be observed even at a position widely deviated from the center of the optical axis. Therefore, the light-emitting element 25 having the diffusing type light distribution characteristic is used as a light-emitting element for expressing the omnidirectional reflection characteristic (diffuse reflection characteristic).

As shown in FIG. 4(b), one pixel of the display unit 104 is formed by using two types of light-emitting elements differing in the light distribution characteristic. As shown in FIG. 4(b), the light-emitting elements 24 of the condensing type and the light-emitting elements 25 of the diffusing type are arranged in one pixel of the display unit 104. Incidentally, the number, arrangement and shapes of the light-emitting elements shown in FIG. 4(b) are just an example; the number, arrangement and shapes of the light-emitting elements are not limited to the example shown in FIG. 4(b).

FIGS. 5(a) to 5(d) are diagrams showing an example of control of light emission distribution of the two types of light-emitting elements 24 and 25 differing in the light distribution characteristic in the first embodiment. FIGS. 5(a) to 5(d) show a case where the directivity of the reflected light is changed by changing light emission ratios (light emission distribution) of the light-emitting elements 24 and 25. FIG. 5(a) shows control in which diffusivity of the reflected light is at the maximum (DIFFUSION MAX) and FIG. 5(d) shows control in which the directivity of the reflected light is at the maximum (DIRECTIVITY MAX).

Incidentally, the control of the light emission distribution of the light-emitting elements 24 and 25 is executed by the control unit 103. In FIGS. 5(a) to 5(d), the light-emitting element 24 is the light-emitting element of the condensing type shown in FIGS. 4(a) and 4(b), and the light-emitting element 25 is the light-emitting element of the diffusing type shown in FIGS. 4(a) and 4(b).

FIG. 5(a) is a diagram showing a light emission distribution example in a case where reflected light having the diffuse reflection characteristic is displayed. As shown in FIG. 5(a), when reflected light having the diffuse reflection characteristic is displayed, only the light-emitting element 25 of the diffusing type is made to emit light without making the light-emitting element 24 of the condensing type emit light. Thus, the light emission distribution of the light-emitting element 24 of the condensing type and the light-emitting element 25 of the diffusing type is 0% and 100%.

FIG. 5(b) is a diagram showing a light emission distribution example in a case where reflected light close to the diffuse reflection characteristic is displayed when both of the diffuse reflection characteristic and the specular reflection characteristic are displayed as a mixture. As shown in FIG. 5(b), when the diffuse reflection characteristic and the specular reflection characteristic are displayed as a mixture, both of the light-emitting element 25 of the diffusing type and the light-emitting element 24 of the condensing type are made to emit light. Further, to implement the light emission distribution close to the diffuse reflection characteristic, the light-emitting element 24 of the condensing type and the light-emitting element 25 of the diffusing type are made to emit light at light emission distribution of 40% and 60%, for example.

FIG. 5(c) is a diagram showing a light emission distribution example in a case where reflected light close to the specular reflection characteristic is displayed when both of the diffuse reflection characteristic and the specular reflection characteristic are displayed as a mixture. As shown in FIG. 5(c), to implement the light emission distribution close to the specular reflection characteristic when the diffuse reflection characteristic and the specular reflection characteristic are displayed as a mixture, the light-emitting element 24 of the condensing type and the light-emitting element 25 of the diffusing type are made to emit light at light emission distribution of 70% and 30%, for example.

FIG. 5(*d*) is a diagram showing a light emission distribution example in a case where reflected light having the specular reflection characteristic is displayed. As shown in FIG. 5(*d*), when reflected light having the specular reflection characteristic is displayed, only the light-emitting element 24 of the condensing type is made to emit light. Thus, the light emission distribution of the light-emitting element 24 of the condensing type and the light-emitting element 25 of the diffusing type is 100% and 0%.

Incidentally, in a case where the specular reflection characteristic and the diffuse reflection characteristic are displayed as a mixture as shown in FIG. 5(*b*) or 5(*c*), the strength of the directivity is expressed by the light emission intensity of the light-emitting element of the condensing type, and the color tone is adjusted by using the color tone when the display unit 104 is viewed from the front as a positive. In a case where coloring due to the installation of the different types of light-emitting elements occurs to the image when the display unit is viewed from an oblique angle, a correction may be made by changing the color tone of the light-emitting elements of the condensing type and the diffusing type in the same pixel.

Figure 6B:
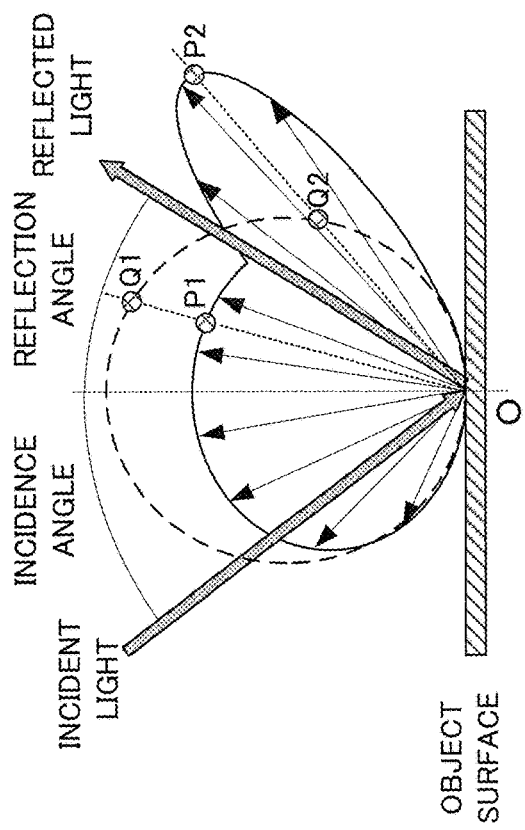
FIGS. 6(a) and 6(b) are diagrams showing general outline of the shape of reflected light in the real world in the first embodiment.
Figure 6A:
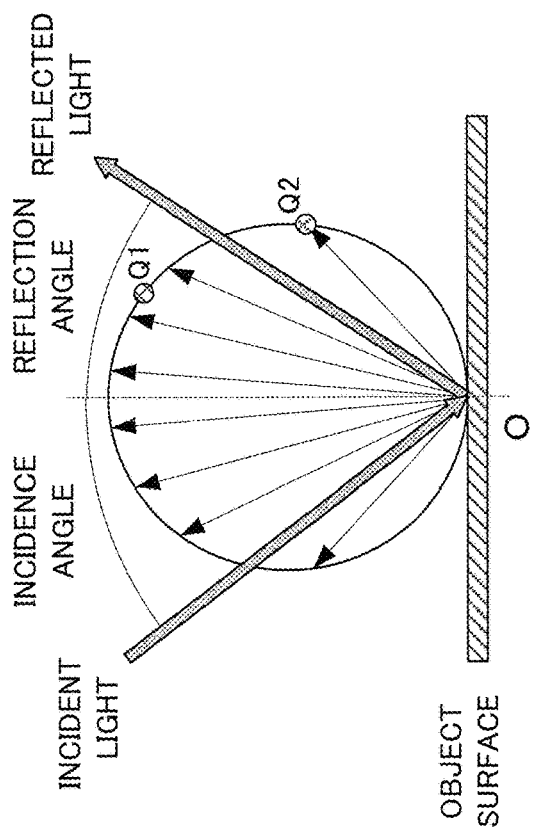

FIGS. 6(*a*) and 6(*b*) are diagrams showing the general outline of the shape of reflected light in the real world in the first embodiment. FIG. 6(*a*) is a diagram showing the general outline of the shape of diffuse reflection light in a case where the object surface has the diffuse reflection characteristic, and FIG. 6(*b*) is a diagram showing the general outline of the shape of specular reflection light in a case where the object surface has the specular reflection characteristic. In FIGS. 6(*a*) and 6(*b*), reflection of incident light at a reflection point O on the object surface is shown. Reference characters Q1 and Q2 in FIGS. 6(*a*) and 6(*b*) represent reflection angles.

As shown in FIG. 6(*a*), when the object surface has the diffuse reflection characteristic and the reflected light is diffuse reflection light, light reflected at the reflection point O is reflected evenly around the reflection point O. In FIG. 6(*a*), reflection intensity $R_{Q1}$ of light reflected at a reflection angle Q1 is indicated by the length of a straight line connecting a point Q1 and the reflection point O. Further, reflection intensity $R_{Q2}$ of light reflected at a reflection angle Q2 is indicated by the length of a straight line connecting a point Q2 and the reflection point O. As shown in FIG. 6(*a*), the reflection intensity $R_{Q1}$ at the reflection angle Q1 is higher than the reflection intensity $R_{Q2}$ at the reflection angle Q2.

When the object surface is judged to have a diffuse reflection characteristic as shown in FIG. 6(*a*) based on the reflection characteristic information included in the texture image data D1, the pixel signal generation unit 102 generates the pixel signal so as to exclusively make the light-emitting elements of the diffusing type emit light.

As shown in FIG. 6(*b*), when the object surface has the specular reflection characteristic and the reflected light is specular reflection light, light reflected at the reflection point O turns into reflected light having directivity. The reflection angle P1 in FIG. 6(*b*) indicates an angle at which the directivity is weak, while the reflection angle P2 in FIG. 6(*b*) indicates an angle at which the directivity is the strongest. The reflection angle P1 in FIG. 6(*b*) is equal to the reflection angle Q1 in FIG. 6(*a*), and the reflection angle P2 in FIG. 6(*b*) is equal to the reflection angle Q2 in FIG. 6(*a*).

In the specular reflection light, the light attenuates greatly compared to the diffuse reflection light at angles other than the angles at which the directivity is strong. Thus, reflection intensity $R_{P1}$ at the reflection angle P1 in FIG. 6(*b*) is lower than the reflection intensity $R_{Q1}$ at the reflection angle Q1 in FIG. 6(*a*). Between the reflection intensity $R_{P1}$ and the reflection intensity $R_{Q1}$, the following relationship holds:

$$\text{reflection intensity } R_{P1} = \text{reflection intensity } R_{Q1} \times OP1/OQ1$$

Here, OP1 is reflected light intensity indicated by the length of a line from the point O to a point P1 in FIG. 6(*b*), and OQ1 is reflected light intensity indicated by the length of a line from the point O to the point Q1 in FIG. 6(*b*). Thus, assuming that the reflection intensity $R_{Q1}$ of the diffuse reflection light is 1 (first threshold value), the reflection intensity $R_{P1}$ takes on a value less than or equal to 1.

In the specular reflection light, the reflection intensity increases greatly compared to the diffuse reflection light at the angles at which the directivity is strong. Thus, reflection intensity $R_{P2}$ at the reflection angle P2 in FIG. 6(*b*) is higher than the reflection intensity $R_{Q2}$ at the reflection angle Q2 in FIG. 6(*a*). Between the reflection intensity $R_{P2}$ and the reflection intensity $R_{Q2}$, the following relationship holds:

$$\text{reflection intensity } R_{P2} = \text{reflection intensity } R_{Q2} \times OP2/OQ2$$

Here, OP2 is reflected light intensity indicated by the length of a line from the point O to a point P2 in FIG. 6(*b*), and OQ2 is reflected light intensity indicated by the length of a line from the point O to the point Q2 in FIG. 6(*b*). Thus, assuming that the reflection intensity $R_{Q2}$ of the diffuse reflection light is 1, the reflection intensity $R_{P2}$ takes on a value greater than 1.

FIGS. 7(*a*) to 7(*c*) are diagrams showing an example of a method of synthesizing reflected light having directivity in the first embodiment. Shown in FIGS. 7(*a*) to 7(*c*) is a method of synthesizing actual reflected light having directivity by using a light-emitting element of the diffusing type and a light-emitting element of the condensing type.

FIG. 7(*a*) is a diagram showing the general outline of the shape of the actual reflected light having directivity, FIG. 7(*b*) is a diagram showing the light distribution characteristic of the light-emitting element of the diffusing type, and FIG. 7(*c*) is a diagram showing the light distribution characteristic of the light-emitting element of the condensing type. Shown in FIGS. 7(*b*) and 7(*c*) is an example of separation of the actual reflected light shown in FIG. 7(*a*).

As shown in FIG. 7(*a*), the actual reflected light having directivity has the maximum reflection intensity $R_{P2}$ at the angle P2 at which the directivity is the strongest, and has the reflection intensity $R_{P1}$ at an angle (e.g., angle P1) other than the angle at which the directivity is the strongest. The angles Q1, P1 and P2 in FIG. 7(*a*) are equal to the angles Q1, P1 and P2 in FIG. 6(*b*).

The actual reflected light having directivity can be separated as shown in FIGS. 7(*b*) and 7(*c*) and can be synthesized by using a light-emitting element of the diffusing type and a light-emitting element of the condensing type. In this case, the pixel signal generation unit 102 generates a pixel signal indicating the light emission intensity of the light-emitting element of the diffusing type and the light emission intensity of the light-emitting element of the condensing type, and the control unit 103 controls the light-emitting elements of the display unit 104 according to the pixel signal. By performing such control, the actual reflected light having directivity can be expressed.

Incidentally, in FIG. 7(c), the light-emitting element of the condensing type is set so that its optical axis is inclined with respect to the object surface. Therefore, in cases of synthesizing reflected light having directivity by the method shown in FIG. 7, each light-emitting element of the condensing type is installed in the display unit 104 so that the optical axis of the light-emitting element of the condensing type is inclined with respect to the display surface of the display unit 104.

FIGS. 8(a) to 8(c) are diagrams showing another example of the method of synthesizing reflected light having directivity in the first embodiment. The case of FIGS. 7(a) to 7(c) is assumed as a case where the optical axis of the light-emitting element of the condensing type is set to be inclined with respect to the display unit 104 (object surface). In contrast, in the cases of FIGS. 8(a) to 8(c), the optical axis of the light-emitting element of the condensing type is set to be orthogonal to the object surface differently from the case of FIGS. 7(a) to 7(c). Further, in FIG. 8(c), the optical axis of the light-emitting element of the condensing type is arranged on the right-hand side of the reflection point O.

Also in this case, the actual reflected light can be synthesized by use of a light-emitting element of the condensing type and a light-emitting element of the diffusing type by adjusting the reflection intensity $R_{P2}$ of the light-emitting element of the condensing type. Therefore, in a case of synthesizing reflected light having directivity by the method shown in FIGS. 8(a) to 8(c), each light-emitting element of the condensing type is installed in the display unit 104 so that the optical axis of the light-emitting element of the condensing type forms the right angle with respect to the display surface of the display unit 104.

FIGS. 9(a) and 9(b) are diagrams showing an example of control of light-emitting elements based on the direction of the directivity of the reflected light in the first embodiment. FIG. 9(a) is a diagram showing a directional vector of the reflected light in an XYZ coordinate system, and FIG. 9(b) is a diagram showing arrangement positions of light-emitting elements of each type on an XY plane in the XYZ coordinate system. FIGS. 9(a) and 9(b) assume the case (case of FIG. 4) where one pixel is famed by combining two light-emitting elements and two light-emitting elements each of which is capable of expressing the RGB colors by one element. Further, the XY plane in FIGS. 9(a) and 9(b) is assumed to be the display surface of the display unit 104.

As shown in FIGS. 9(a) and 9(b), light-emitting elements 241 and 242 of the condensing type and light-emitting elements 251 and 252 of the diffusing type are arranged on the XY plane in the XYZ coordinate system. As shown in FIG. 9(a), the light-emitting element 241 of the condensing type is arranged at a position (−x, −y) in the XY plane, the light-emitting element 242 of the condensing type is arranged at a position (+x, +y) in the XY plane, the light-emitting element 251 of the diffusing type is arranged at a position (−x, +y) in the XY plane, and the light-emitting element 252 of the diffusing type is arranged at a position (+x, −y) in the XY plane.

Further, the XY plane in FIGS. 9(a) and 9(b) is divided at a boundary line X=−Y into a region A and a region B. In FIGS. 9(a) and 9(b), the region A is indicated by a white background, while the region B is indicated by hatching. As shown in FIGS. 9(a) and 9(b), the light-emitting element 242 of the condensing type is situated in the region A and the light-emitting element 241 of the condensing type is situated in the region B.

In FIG. 9(a), the direction of the directivity of the reflected light at a particular pixel, in a case where the reflection intensity calculated at the particular pixel is higher than the reflection intensity of the diffuse reflection light, is indicated by a vector (X, Y, Z) (x, y, z). As shown in FIG. 9(a), the values (x, y) representing the direction of the directivity of the reflected light (first direction) are situated within the region A in the XY plane.

In this case, control for making the light-emitting element 242 of the condensing type (first condensing type element) and the light-emitting elements 251 and 252 of the diffusing type arranged in the region A in the XY plane emit light is carried out. The light-emitting element 241 of the condensing type (second condensing type element) arranged in the region B is not made to emit light. By this control, the direction of the directivity of the reflected light, situated within the region A, can be expressed.

In contrast, when the values (x, y) representing the direction of the directivity of the reflected light are situated within the region B in the XY plane, control for making the light-emitting element 241 of the condensing type and the light-emitting elements 251 and 252 of the diffusing type situated in the region B emit light is carried out. The light-emitting element 242 of the condensing type arranged in the region A is not made to emit light. By this control, the direction of the directivity of the reflected light, situated within the region B, can be expressed.

When the direction (x, y) of the directivity of the reflected light is situated on the boundary line X=−Y, it is possible to make both of the light-emitting elements 241 and 242 of the condensing type emit light. In this case, the light emission intensity is desired to be adjusted in regard to each light-emitting element.

By selecting a light-emitting element of the condensing type to be made to emit light according to the direction of the directivity of the reflected light as above, the direction of the directivity of the reflected light on the displayed object can be expressed and the direction of reflection at each displaying pixel can be changed.

Figure 10:
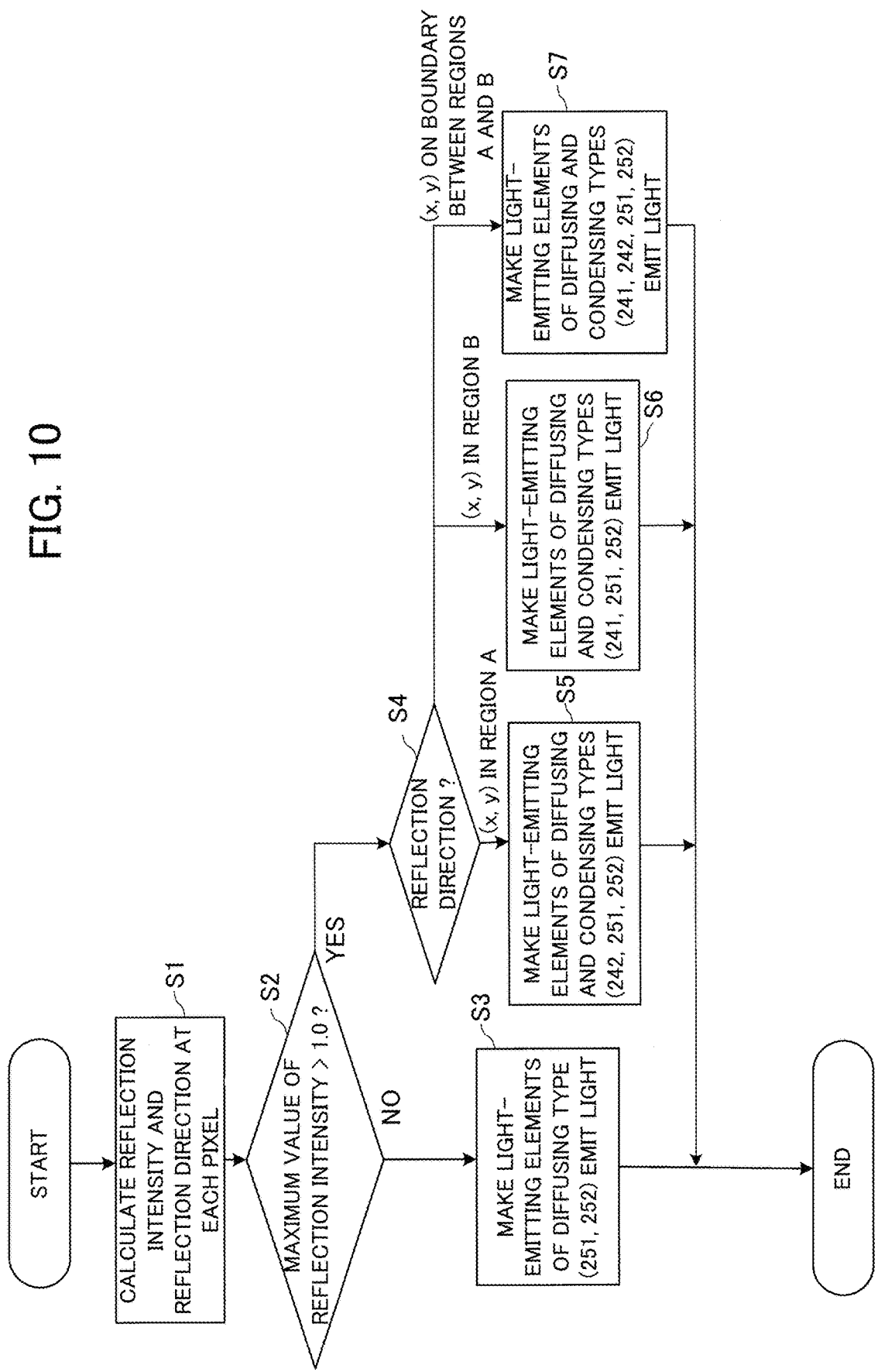
FIG. 10 is a flowchart showing an operation in which a pixel signal is generated in a pixel signal generation unit in the first embodiment.

FIG. 10 is a flowchart showing an operation of generating the pixel signal in the pixel signal generation unit 102 in the first embodiment. FIG. 10 is assumed to be a flowchart for handling pixel structure equivalent to the pixel structure shown in FIGS. 9(a) and 9(b). Thus, two light-emitting elements 241 and 242 of the condensing type and two light-emitting elements 251 and 252 of the diffusing type are arranged in one pixel of the display unit 104.

First, in step S1, the direction and the reflection intensity of the reflected light at each pixel are calculated from the inputted texture image data D1. Subsequently, the process advances to step S2 and a judgment is made on whether the maximum value of the reflection intensity calculated in the step S1 is a value greater than 1 or not on the assumption that the reflection intensity of the diffuse reflection light is 1.

If the maximum value of the reflection intensity is a value less than or equal to 1 (NO in the step S2), the reflected light is judged to be diffuse reflection light and the process advances to step S3, in which the light-emitting elements 251 and 252 of the diffusing type are made to emit light and the light-emitting elements 241 and 242 of the condensing type are not made to emit light.

If the reflection intensity judged in the step S2 is a value greater than 1 (YES in the step S2), the process advances to step S4, and the direction of the directivity of the reflected light is judged in the step S4.

When the values (x, y) in the vector (X, Y, Z)=(x, y, z) representing the direction of the directivity of the reflected light are situated within the region A in FIGS. 9(a) and 9(b), the process advances to step S5, and the light-emitting elements 251 and 252 of the diffusing type and the light-emitting element 242 of the condensing type are made to emit light in the step S5.

When the values (x, y) in the vector (X, Y, Z)=(x, y, z) representing the direction of the directivity of the reflected light are situated within the region B in FIGS. 9(a) and 9(b), the process advances to step S6, and the light-emitting elements 251 and 252 of the diffusing type and the light-emitting element 241 of the condensing type are made to emit light in the step S6.

When the values (x, y) in the vector (X, Y, Z)=(x, y, z) representing the direction of the directivity of the reflected light are situated on the boundary line between the region A and the region B in FIGS. 9(a) and 9(b), the process advances to step S7, and the light-emitting elements 251 and 252 of the diffusing type and the light-emitting elements 241 and 242 of the condensing type are made to emit light in the step S7.

As above, the control unit 103 selects a plurality of light-emitting elements arranged in the display unit 104 and differing in the light distribution characteristic and makes the selected light-emitting elements emit light based on the pixel signal generated by the pixel signal generation unit 102 (e.g., the RGB values and the light emission ratios in regard to each pixel included in the pixel signal). Control with high response speed is possible by directly driving the light-emitting elements. Accordingly, it is possible to deal with not only still images but also motion video and the light distribution can be controlled at high speed and with high definition.

(1-2) Effect of First Embodiment

As described above, in the texture display device 100 according to the first embodiment, the color and the spreading of light from each pixel are controlled by adjusting the light emission intensity of each of the light-emitting elements differing in the light distribution characteristic according to the reflection characteristic of the displayed object. This makes it possible to change the appearance of the object displayed on the texture display device 100 depending on the angle of viewing the texture display device 100, and to improve the feel of texture and presence of the displayed images.

In the texture display device 100 according to the first embodiment, light-emitting elements differing in the light distribution characteristic are combined together and used in one pixel. With this configuration, the additional cost can be reduced compared with the conventional technology since it is unnecessary to use additional parts such as lenses.

In the texture display device 100 according to the first embodiment, the light-emitting elements are directly driven on a pixel-by-pixel basis. Accordingly, it is possible to deal with not only still images but also motion video and the light distribution can be controlled at high speed and with high definition.

In the texture display device 100 according to the first embodiment, it is possible to mount light-emitting elements so that their optical axes are inclined with respect to the display surface of the display unit 104, as well as mounting light-emitting elements so that their optical axes are orthogonal to the display surface of the display unit 104. Accordingly, the reflection characteristic of the object can be expressed in greater variety, and the feel of texture and presence of the displayed images can be improved.

In the texture display device 100 according to the first embodiment, the pixel signal generation unit 102 generates the signal for controlling each pixel based on the received texture image data D1 including the reflection characteristic information. Accordingly, a variety of reflection characteristics can be inputted and expressed.

In the texture display device 100 according to the first embodiment, the actual reflected light can be synthesized as shown in FIGS. 7(a) to 7(c) or FIGS. 8(a) to 8(c) by using light-emitting elements of the diffusing type and light-emitting elements of the condensing type. By performing such control, actual specular reflection light having directivity or actual diffuse reflection light can be expressed.

(2) Second Embodiment

Figure 11:
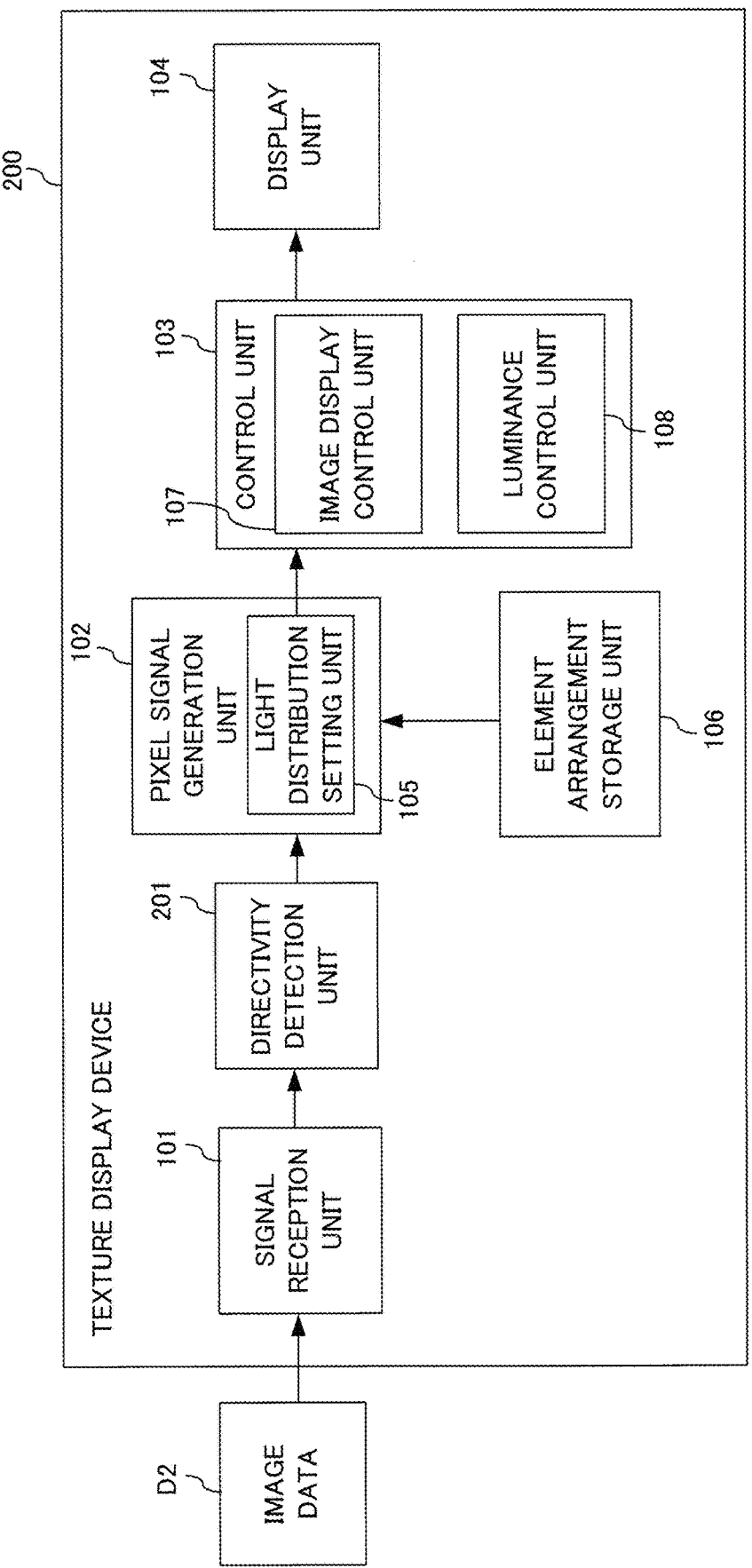
FIG. 11 is a block diagram showing a general configuration of a texture display device according to a second embodiment of the present invention.

FIG. 11 is a block diagram showing the general configuration of a texture display device 200 according to a second embodiment of the present invention. As shown in FIG. 11, the texture display device 200 according to the second embodiment differs from the texture display device 100 according to the first embodiment in including a directivity detection unit 201. Except for the component mentioned above, the configuration is the same as that of the texture display device 100 according to the first embodiment, and thus repeated description thereof is omitted.

In the second embodiment, the input data received by the signal reception unit 101 includes only the image data D2 of the object to be displayed and does not include the texture data D3 of the object to be displayed. The signal reception unit 101 loads the received image data D2 and transmits an image signal of each frame to the directivity detection unit 201.

The directivity detection unit 201 generates the texture data D3 by detecting a region where the directivity of the reflected light is strong in the received image data D2. The texture data D3 generated by the directivity detection unit 201 is transmitted to the pixel signal generation unit 102 together with the image data D2. The pixel signal generation unit 102 generates the pixel signal so as to make light-emitting elements of the diffusing type or the condensing type emit light based on the received texture data D3 and image data D2.

In the texture display device 200 according to the second embodiment, the texture data D3 is generated by detecting a region where the directivity of the reflected light is strong in the received image data D2. Therefore, the texture of the displayed object can be displayed even when the texture data D3 is not received as the input data.

(3) Modification

The present invention is applicable to displays capable of displaying the RGB colors with one pixel, such as liquid crystal displays, organic EL displays and LED displays. The present invention is applicable also to LED displays famed with light-emitting elements displaying a single color such as R, G or B with one pixel.

The shape of the display device to which the present invention is applicable is not limited to a flat shape. The present invention is applicable also to displays having different shapes like a curved surface, a sphere, etc.

DESCRIPTION OF REFERENCE CHARACTERS

20: light-emitting element of 1 in 1 condensing type, 21: light-emitting element of 1 in 1 diffusing type, 20a: light distribution characteristic of light-emitting element of 1 in 1 condensing type, 21a: light distribution characteristic of light-emitting element of 1 in 1 diffusing type, 24: light-emitting element of 3 in 1 condensing type, 25: light-emitting element of 3 in 1 diffusing type, 24a: light distribution characteristic of light-emitting element of 3 in 1 condensing type, 25a: light distribution characteristic of light-emitting element of 3 in 1 diffusing type, 30: one pixel formed with light-emitting elements of 1 in 1 type, 31: light-emitting element (B) of 1 in 1 condensing type, 32: light-emitting element (B) of 1 in 1 diffusing type, 33: light-emitting element (G) of 1 in 1 condensing type, 34: light-emitting element (G) of 1 in 1 diffusing type, 35: light-emitting element (R) of 1 in 1 condensing type, 36: light-emitting element (R) of 1 in 1 diffusing type, 40: one pixel formed with light-emitting elements of 3 in 1 type, 100: texture display device, 101: signal reception unit, 102: pixel signal generation unit, 103: control unit, 104: display unit, 105: light distribution setting unit, 106: element arrangement storage unit, 107: image display control unit, 108: luminance control unit, 200: texture display device, 201: directivity detection unit, D1: texture image data, D2: image data, D3: texture data.

What is claimed is:

1. A texture display device comprising:
    a display unit including a plurality of pixels each of which includes a condensing type element that emits light having light distribution at a first spread angle and a diffusing type element that emits light having light distribution at a second spread angle larger than the first spread angle; and
    processing circuitry configured to
        generate a pixel signal including light emission intensity information on the condensing type element and the diffusing type element based on image data of an object to be displayed on the display unit and texture data including reflection characteristic information on the object; and
        control light emission intensity of the condensing type element and the diffusing type element based on the pixel signal, wherein
    the texture data includes information indicating a plurality of directions of reflected light from the object and information indicating a plurality of reflection intensities respectively representing intensities of the reflected light from the object in the plurality of directions, and
    the processing circuitry performs control for making the diffusing type element emit light and not making the condensing type element emit light when a maximum value of the plurality of reflection intensities is a value less than or equal to a first threshold value and performs control for making the condensing type element and the diffusing type element emit light when the maximum value is a value greater than the first threshold value.

2. The texture display device according to claim 1, wherein
    each of the plurality of pixels includes a first condensing type element and a second condensing type element as the condensing type element, and
    the processing circuitry performs control for selecting the first condensing type element or the second condensing type element and making the selected condensing type element emit light when the maximum value is a value greater than the first threshold value.

3. The texture display device according to claim 2, wherein
    the first condensing type element is arranged on a first direction side in a pixel where the reflection intensity hits a maximum, the pixel being one of the plurality of pixels,
    the second condensing type element is arranged on a side opposite to the first direction side in the pixel, and
    the processing circuitry performs control for making the first condensing type element emit light and not making the second condensing type element emit light when the maximum value is a value greater than the first threshold value.

4. The texture display device according to claim 1, wherein the processing circuitry is further configured to detect a region where directivity of the reflected light in the image data of the object is strong and to generate the texture data based on the detected region.

5. A texture display method comprising:
    generating a pixel signal including light emission intensity information on a condensing type element and a diffusing type element based on image data of an object to be displayed on a display unit including a plurality of pixels each of which includes the condensing type element emitting light having light distribution at a first spread angle and the diffusing type element emitting light having light distribution at a second spread angle larger than the first spread angle and texture data including reflection characteristic information on the object; and
    controlling light emission intensity of the condensing type element and the diffusing type element based on the pixel signal, wherein
    the texture data includes information indicating a plurality of directions of reflected light from the object and information indicating a plurality of reflection intensities respectively representing intensities of the reflected light from the object in the plurality of directions, and
    the diffusing type element is controlled to emit light and the condensing type element is controlled to not emit light when a maximum value of the plurality of reflection intensities is a value less than or equal to a first threshold value and the condensing type element and the diffusing type element are both controlled to emit light when the maximum value is a value greater than the first threshold value.

6. A texture display device comprising:
    a processor to execute a program; and
    a memory to store the program which, when executed by the processor, performs
    generating a pixel signal including light emission intensity information on a condensing type element and a diffusing type element based on image data of an object to be displayed on a display unit including a plurality of pixels each of which includes the condensing type element emitting light having light distribution at a first spread angle and the diffusing type element emitting light having light distribution at a second spread angle larger than the first spread angle and texture data including reflection characteristic information on the object; and
    controlling light emission intensity of the condensing type element and the diffusing type element based on the pixel signal, wherein the texture data includes information indicating a plurality of directions of reflected light from the object and information indicating a plurality of reflection intensities respectively representing intensities of the reflected light from the object in the plurality of directions, and
the diffusing type element is controlled to emit light and the condensing type element is controlled to not emit light when a maximum value of the plurality of reflection intensities is a value less than or equal to a first threshold value and the condensing type element and the diffusing type element are both controlled to emit light when the maximum value is a value greater than the first threshold value.

\* \* \* \* \*